(12) United States Patent
Cheng et al.

(10) Patent No.: US 9,413,793 B2
(45) Date of Patent: Aug. 9, 2016

(54) RICH PROFILE COMMUNICATION WITH NOTIFICATIONS

(71) Applicant: Microsoft Corporation, Redmond, WA (US)

(72) Inventors: Lili Cheng, Bellevue, WA (US); David P. Vronay, Beijing (CN); Ryszard K. Kott, Redmond, WA (US); Sean U. Kelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 13/842,369

(22) Filed: Mar. 15, 2013

(65) Prior Publication Data

US 2013/0219301 A1 Aug. 22, 2013

Related U.S. Application Data

(62) Division of application No. 10/758,359, filed on Jan. 15, 2004, now Pat. No. 8,418,067.

(51) Int. Cl.
| | | |
|---|---|---|
| *G06Q 10/06* | (2012.01) | |
| *H04L 29/06* | (2006.01) | |
| *H04L 29/08* | (2006.01) | |
| *H04L 12/58* | (2006.01) | |

(52) U.S. Cl.
CPC .............. *H04L 65/403* (2013.01); *G06Q 10/06* (2013.01); *H04L 12/587* (2013.01); *H04L 51/24* (2013.01); *H04L 67/24* (2013.01); *H04L 67/306* (2013.01); *H04L 12/581* (2013.01); *H04L 51/04* (2013.01)

(58) Field of Classification Search
CPC .................................................. H04L 65/403
USPC ......................................................... 715/805
See application file for complete search history.

(56) References Cited

U.S. PATENT DOCUMENTS

| 5,564,051 | A | 10/1996 | Halliwell et al. |
| 6,430,602 | B1 * | 8/2002 | Kay ................... G06F 17/30867 707/999.003 |
| 6,501,834 | B1 * | 12/2002 | Milewski ................ H04L 51/36 379/88.17 |
| 6,549,937 | B1 * | 4/2003 | Auerbach ............. H04L 12/581 709/206 |
| 6,631,412 | B1 * | 10/2003 | Glasser ................... H04L 29/06 709/204 |
| 6,651,086 | B1 * | 11/2003 | Manber ............... H04L 12/1822 707/999.102 |
| 6,915,284 | B2 * | 7/2005 | Adar ....................... G06Q 10/10 434/118 |
| 6,987,840 | B1 | 1/2006 | Bosik et al. |
| 6,999,955 | B1 * | 2/2006 | Horvitz ................ G06N 99/005 706/45 |

(Continued)

OTHER PUBLICATIONS

Ask.com, "Cost benefit correctly render", retrieved on Nov. 25, 2012, at http:www.ask.com/web?q=cost+benefit+correctly+render&qsrc=0&o=0&l=dir, 1 page.

(Continued)

*Primary Examiner* — Reza Nabi
(74) *Attorney, Agent, or Firm* — Steve Wight; Douglas J. Barker; Micky Minhas

(57) ABSTRACT

A rich communication profile system with notifications. The system is a feedback mechanism that utilizes rich content, e.g., multimedia content, as one or more indicators that represent the status of a remote user. The system includes a state component that receives information relating to state of at least one entity. A notifications component dynamically renders at least one personalized graphical indicia representative of the entity's state. The entity can be a person, group of people, component, place, and object.

18 Claims, 12 Drawing Sheets

(56) References Cited

U.S. PATENT DOCUMENTS

| | | | |
|---|---|---|---|
| 7,039,654 B1 | 5/2006 | Eder | |
| 7,092,992 B1 | 8/2006 | Yu | |
| 7,139,797 B1* | 11/2006 | Yoakum | H04L 65/1096 709/204 |
| 7,752,096 B2 | 7/2010 | Santalo et al. | |
| 8,160,549 B2* | 4/2012 | Bychkov | G06Q 50/24 358/1.13 |
| 8,407,344 B2* | 3/2013 | Zabawskyj | G06F 17/30867 379/201.02 |
| 8,418,067 B2* | 4/2013 | Cheng | G06Q 10/06 715/739 |
| 8,775,972 B2* | 7/2014 | Spiegel | G06F 21/6245 715/747 |
| 8,782,153 B2* | 7/2014 | Ho | G06Q 10/10 709/206 |
| 8,818,343 B1* | 8/2014 | Martin | H04W 4/18 455/414.3 |
| 8,910,076 B2* | 12/2014 | Fernandez | G06T 11/60 715/792 |
| 2002/0021307 A1* | 2/2002 | Glenn | G06F 17/30867 715/753 |
| 2002/0113797 A1 | 8/2002 | Potter et al. | |
| 2003/0061114 A1 | 3/2003 | Schwartz et al. | |
| 2003/0088544 A1 | 5/2003 | Kan et al. | |
| 2003/0108241 A1* | 6/2003 | Colmenarez | G06F 17/30265 382/181 |
| 2003/0115203 A1* | 6/2003 | Brown | G06F 17/30867 |
| 2003/0154446 A1* | 8/2003 | Constant | H04L 12/5895 715/256 |
| 2003/0236835 A1* | 12/2003 | Levi | H04L 12/1813 709/204 |
| 2004/0017396 A1* | 1/2004 | Werndorfer | G06F 3/167 715/751 |
| 2004/0024846 A1* | 2/2004 | Randall | H04L 67/04 709/219 |
| 2004/0039934 A1* | 2/2004 | Land | G11B 27/34 726/26 |
| 2004/0196315 A1* | 10/2004 | Swearingen | G06Q 10/107 715/804 |
| 2004/0237759 A1* | 12/2004 | Bill | G06F 17/30017 84/668 |
| 2004/0249846 A1* | 12/2004 | Randall | H04M 1/576 |
| 2005/0097473 A1* | 5/2005 | Malik | H04L 12/581 715/739 |
| 2005/0125496 A1* | 6/2005 | Thuerk | H04L 12/581 709/204 |
| 2005/0160167 A1* | 7/2005 | Cheng | G06Q 10/06 709/224 |
| 2006/0004911 A1* | 1/2006 | Becker | H04L 51/043 709/207 |
| 2006/0041487 A1 | 2/2006 | Santalo et al. | |
| 2006/0058046 A1* | 3/2006 | Matsuura | G06Q 30/02 455/457 |
| 2006/0080640 A1* | 4/2006 | Cheng | G06F 8/316 717/120 |
| 2006/0095507 A1* | 5/2006 | Watson | G06F 17/30867 709/203 |
| 2006/0129933 A1* | 6/2006 | Land | G11B 27/034 715/723 |
| 2006/0143647 A1* | 6/2006 | Bill | G06F 17/30743 725/10 |
| 2006/0170945 A1* | 8/2006 | Bill | G06F 17/30749 358/1.13 |
| 2007/0113181 A1* | 5/2007 | Blattner | G06F 3/011 715/706 |
| 2007/0168450 A1* | 7/2007 | Prajapat | G06F 17/289 709/207 |
| 2008/0027769 A1 | 1/2008 | Eder | |
| 2008/0082613 A1* | 4/2008 | Szeto | H04L 51/043 709/206 |
| 2008/0176655 A1* | 7/2008 | James | G06F 19/3475 463/42 |
| 2009/0013059 A1* | 1/2009 | Partaker | H04L 65/1096 709/217 |
| 2009/0171740 A1 | 7/2009 | Eder | |
| 2009/0276700 A1* | 11/2009 | Anderson | G06Q 10/00 715/700 |
| 2010/0011388 A1* | 1/2010 | Bull | H04N 21/41407 725/9 |
| 2010/0057875 A1* | 3/2010 | Bychkov | G06Q 50/24 709/206 |
| 2010/0257080 A1 | 10/2010 | Santalo et al. | |
| 2011/0295952 A1* | 12/2011 | Buyukkokten | G06Q 30/02 709/204 |
| 2011/0296324 A1* | 12/2011 | Goossens | G06Q 10/10 715/763 |
| 2012/0030623 A1* | 2/2012 | Hoellwarth | G06F 3/04817 715/811 |
| 2012/0296789 A1* | 11/2012 | Friedman | G06Q 20/108 705/35 |
| 2013/0298044 A1* | 11/2013 | Bill | G06F 17/30749 715/753 |

OTHER PUBLICATIONS

Ask.com, "factor benefit correctly render", retrieved on Nov. 25, 2012, at http://www.ask.com/web? qrsc=1&o=0&1=fir &q=factor+cost+benefit+correctly+render, 2 pages.

Berchtold, et al., "SaveMe: A system for Archiving Electronic Documents Using Messaging Groupware", WACC'99, 1999, pp. 167-176, San Francisco, California USA.

Cowart, "Mastering Windows 95", 1995, Sybex, p. 561.

Wiegel, "Secure External References in Multimedia Email Messages", CCS'96, 1996, pp. 11-18, New Delhi, India.

Woo, et al., "Pigeon: A Wireless Two-Way Messaging System", IEEE Journal of Selected Areas in Communications, 1997, 16 pages, vol. XX-No. Y.

\* cited by examiner

RICH PROFILE COMMUNICATION WITH NOTIFICATIONS

CROSS REFERENCE TO RELATED APPLICATIONS

This patent application is a divisional of co-pending, commonly owned U.S. patent application Ser. No. 10/758,359, filed Jan. 15, 2004, entitled "RICH PROFILE COMMUNICATION WITH NOTIFICATIONS", which application is hereby incorporated in its entirety by reference.

TECHNICAL FIELD

This invention is related to computer messaging, and more specifically to messaging that uses rich content.

BACKGROUND OF THE INVENTION

Messaging communications programs are pervasive in computing and communication environments, and gaining extensive use with global communications networks, such as the Internet. When communicating with others by way of computing and communication devices (e.g., mobile telephones, PDAs, and other similar computing devices capable of user-to-user communication) a notion of user status and profile is frequently used. The user status can be displayed that indicates if the user is "Online" or "Away", for example.

However, given the increasing capabilities provided by software and hardware of such computing and communication devices, a user is still limited by the offerings of conventional systems to more effectively communicate the status of the user or groups of users in a messaging communication regime. What is need is an improved messaging system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises an improved system of rich profiles with notifications that facilitates a feedback mechanism for indicating to a local user the state of a remote user or entity in which the local user is interested. This can be implemented in association with a messaging system, and more particularly, with an instant messaging system. The rich profile can include graphical indicia in the form of collections of pictures, video, text, text annotations, notification representations, and other elements or multimedia content. The profile data can be shared through a web service or real-time notification system via a messaging-type communication, RSS (Really Simple Syndication) feed, or a peer-to-peer service, for example. The rich profile data can be pushed actively to people who subscribe to the profile, and may be used as a tool of peripheral awareness of the status of the person represented by the profile. Moreover, a single profile can be used to represent a group of people, and typically, several profiles may be used to represent the status of different people or groups of people.

In another aspect thereof, there is provided at least two layers of profile implementation. In a first layer or implementation, a user profile of a local user is automatically made accessible to all users of the system. In a second layer, the user profile of the local user can be made accessible to the outside user according to one or more levels of permission authorized by the local user. Moreover, the outside user, who is permitted access as an allowed user, can be granted total read/write (R/W) access to profile content of the local user, partial R/W access as an allowed user to only read certain content, yet edit (or write) other content, or read-only access. Where permissions are used, this can be accomplished automatically according to, for example, network permissions that can be made available to the architecture of the present invention such that if a user is known to be a member of a group, such group permissions can be automatically propagated to the messaging architected such that the local user does not need to manually address message authorizations from many outside users of the same group who might request access.

In another aspect of the present invention, the representation of people in the messaging is richer by allowing use of multimedia, with pictures being the most obvious example of representation that people want to use.

In yet another aspect thereof, the representation is updateable in real-time through an appropriate notification system, such the representation can convey not only static information, but also an activity status associated with the person of the profile.

In still another aspect of the present invention, the representation is suitable to a peripheral awareness context utilizing appropriate graphical indicia to represent aspects of the user of the profile such as activity, and information decay due to the passage of time.

In another aspect, the representation is suitable for providing a peripheral awareness context for several people or groups of people that need to be represented at the same time.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
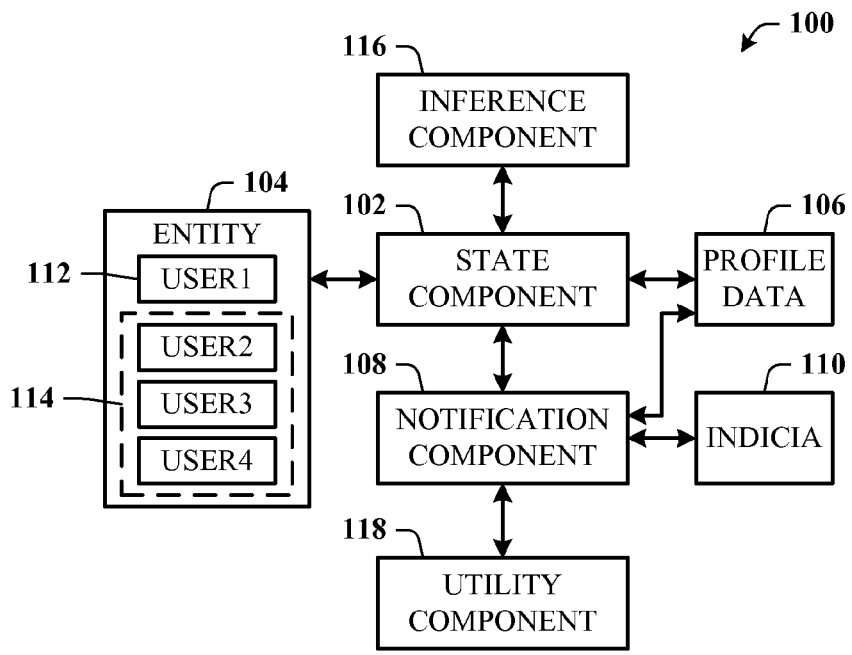
FIG. 1 illustrates a rich profile messaging communication system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a rich profile messaging communication system 100 of the present invention. The system 100 is a notification system that feeds back information to one user about the status of another user using a rich profile system that can utilize multimedia content. The system 100 includes a state component 102 that interfaces to an entity 104 to determine the state thereof. When the state is determined, the state component 102 accesses profile data 106 associated with the entity 104, and retrieves state data representative of the state of the entity 104. The state component 102 then sends the state data to a notifications component 108. The notifications component 106 processes the state data and dynamically renders at least one personalized graphical indicia 110 representative of the state of the entity 108 that is perceived by the user. The personalized indicia 110 correlate to the context of the entity state. The notifications component 108 dynamically renders annotations or comments as a function of entity state. Note also that the notifications component 108 can also be configured to access the profile data 106. The system 100 can further comprise an inference component 116 that infers the state of the entity based on extrinsic data. A utility component 118 interfaces to the notifications component 108 to factor costs associated with rendering an incorrect image (or profile data) versus the benefit of rendering a correct image (or profile data).

The entity 104 can be at least a single individual 112 (also denoted as USER1), or a group of individuals 114 (also denoted as USER2, USER3, and USER4). The entity 104 can also be a component, place, or object. The profile data 106 is stored at a storage location, and is the profile information for the entity (i.e., single individual 112, group of individuals 114, object, place and component) such that when the entity 104 is determined, the system 100 accesses the corresponding profile information 106 for processing and presentation to the requesting user.

The system 100 facilitates notifications based on rich profile data 106 that can include collections of pictures, video, audio, text, text annotations, notification representations, and other components or elements of multimedia. The profile data 106 can be shared through a web service or real-time notification system via a messaging-type communication, RSS (Really Simple Syndication) feed, or a peer-to-peer service, for example. The rich profile data 106 can be pushed actively to people who subscribe to the profile, and can be used as a tool of peripheral awareness of the status of the person represented by the profile. Moreover, a single profile can be used to represent the entity 104 that is a group of people, and typically, several profiles can be used to represent the status of different people or groups of people.

The system 100 can be employed as a hardware component that renders indicia as a function of device capabilities. For example, if the device is a PDA, the presentation of certain indicia normally utilized for a large display can be automatically replaced with more suitable indicia that are compatible for presentation on the PDA device.

Images can also be rendered as a function of the recipient. For example, a first image may be considered suitable for presentation to a close friend, but less suitable for presentation to a supervisor or upper management of the current user.

The disclosed system 100 facilitates profile generation, profile migration, and profile sharing. This can be accomplished by the current user or another user. Implementation is contemplated for at least instant messaging systems, electronic mail (e-mail) systems, telephone systems, web logs (BLOGs), social networks, and contact lists. Content includes at least animation, pictures, music and voice annotations, and textual annotations. Such content can be presented in the form of a slide show, which is described hereinbelow. Content can be associated with temporal data such that over time, the content is indicated as aging (a level of freshness), but can also be removed manually or caused to be remove automatically. The system 100 is sufficiently robust to facilitate ranking of content based upon a number of criteria, including popularity of the content and number of comments, for example.

The system 100 also facilitates one user viewing the profile of another user. Additionally, one user can impose levels of access to individuals, wherein one person may have a higher level of access that allows that person more extensive viewing and/or content manipulation than another user who has a lower level of access granted.

A profile can be created with multiple tiles of images or content, wherein a first set of content can be for a family group, second set of content can be for a work group, and a third set of content can be for a group associated with play or sports, for example. Selected content can be spread across the multiple tiles. Content can also be viewed in multiple ways wherein the user can size and format images according to personal preferences. The tiles can be organized in a predetermined manner according to, for example, content size, location, user preference and priority of importance to the user, and relationship to the group or organization. Content can be stacked and presented in a rolodex fashion. The system also facilitates pushing and/or pulling profiles (using for example RSS), content formatting, and content data between locations over traditionally networks. This can be accomplished with security and privacy by encryption, for example.

It is to be appreciated by one skilled in the art that the system of the present invention can employ automated features. For example, where a daily event occurs with regular frequency, the system can be configured to automatically change the state of a user profile accordingly. For example, where the user routinely goes to lunch at about the same time each day, or there is a regularly scheduled meeting on the same day each week, the user can configure the system to automatically change the user profile to reflect these events at about the time the events actually occur, such that outside users inquiring as to the state of the local user are made aware of his or her status through the use of corresponding multimedia content.

In a more robust implementation, the inference component 116 can be employed to infer the state of a user in the future according to past data that has been recorded and analyzed such there is now a high degree of confidence that the user will be at that event at a given time in the future. The system will then automatically make the appropriate change in the local user profile at the predicted time to provide feedback to interested users as to the state of the local user. Thus, by employing this feature, the local user does not need to manually address such changes in state that occur on a seemingly regular basis.

Figure 2:
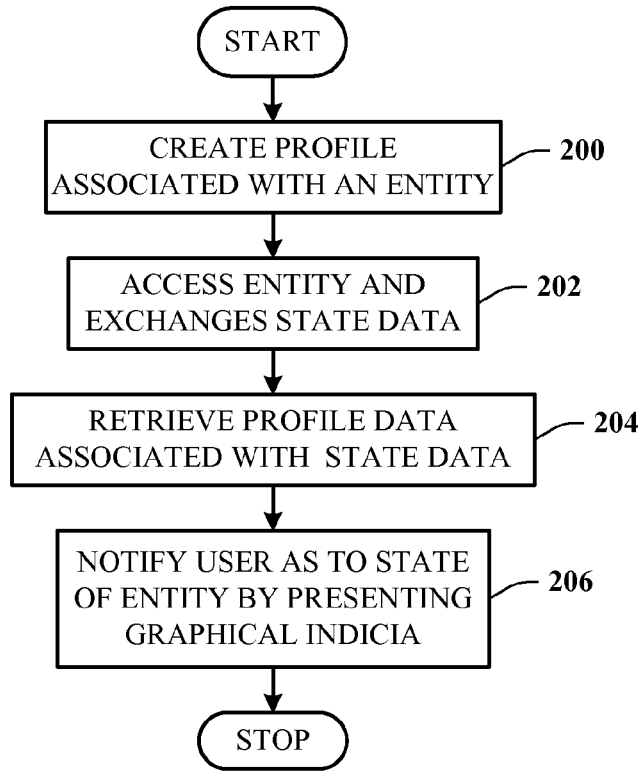
FIG. 2 illustrates a flow chart of a process of the present invention.

Referring now to FIG. 2, there is illustrated a flow chart of a process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the local user creates a user profile having associated profile (or entity) data. The user profile can include content (or graphical indicia) that represents a number of different entities, such as another user or a group of users, for example. Thus, the graphical indicia is linked to corresponding profiles of the other users and groups of users such that when a state of one or more of the other entities changes, the change in state is reflected accordingly in the user profile of the local user, as a means of feedback to the local user of the state of the entity.

At 202, the system accesses the entity associated with the entity data and exchanges state data about the entity, and other entities being profiled. That is, a local system of a local user who has a local profile will periodically or in accordance with predetermined events, access profiles of other users in which the local user is interested, and return state information associated with each of those entity states. This can be initiated on a system-wide basis from a central system, and/or based upon the local system of the local user. For example, on a system-wide basis, a central system can send a signal to all client systems to update the entity data for the user profiles of the messaging system. Alternatively, the user machine can be configured to prompt all entity systems in which the local user is interested, for entity state information. The latter implementation supports a peer-to-peer environment that is a common topology for user messaging. Thus, for example, a polling scheme can be implemented between devices of selected users of a group to continually update user status, or a change-in-status can be a triggering event that causes a signal to be sent to all or selected users to indicate that changed state.

At 204, the state data indicates the state of the entity that the entity wishes to indicate. For example, where the entity is a single user, and the user has gone to lunch, the user can alter his/her profile to include multimedia that reflects to the inquiring user that they have gone to lunch. This can be an image showing the user eating, or a video clip related to eating food, or an audio clip that is a voice message of the user who went to lunch. In response, the system retrieves the profile data associated with the state data of the entity. At 206, the user is notified as to the state of the entity by the presentation of the multimedia content (or graphical indicia) representative of the state of the entity. The process then reaches a Stop block.

Figure 3:
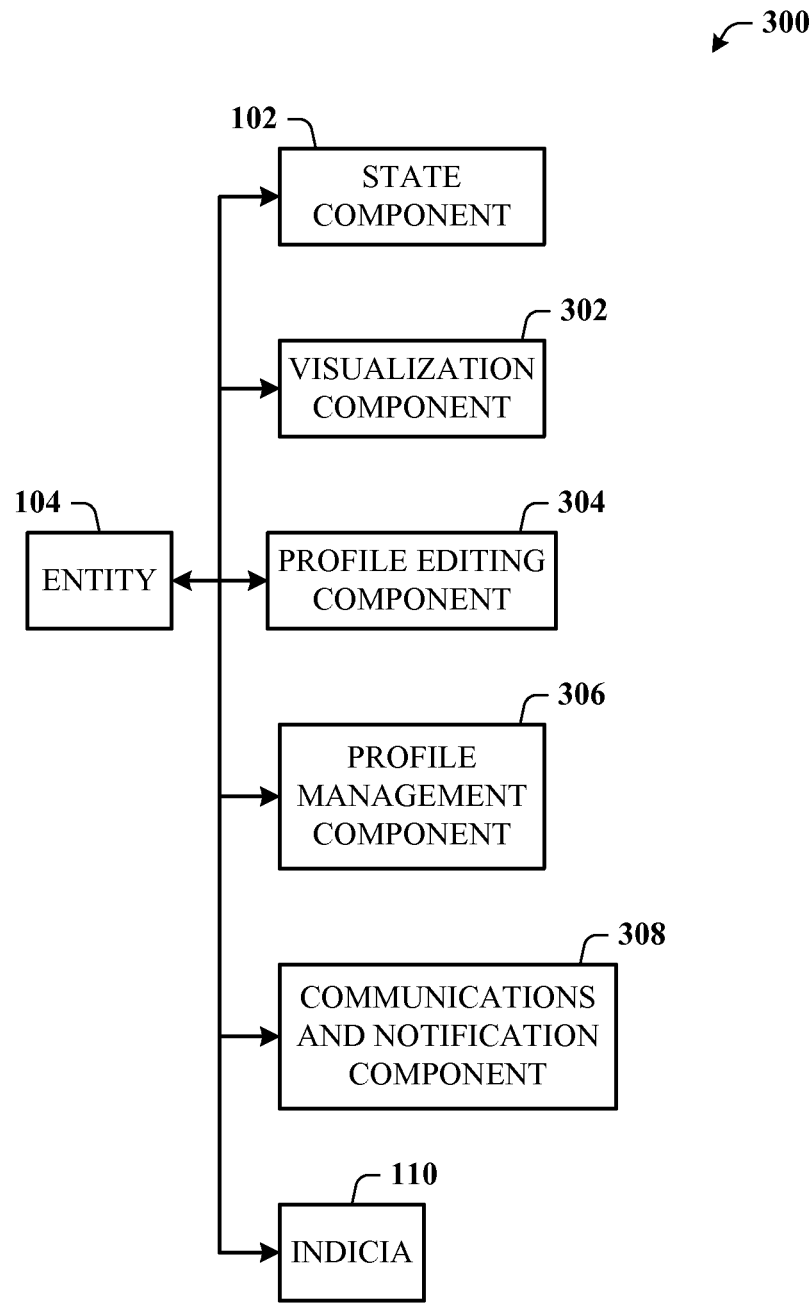
FIG. 3 illustrates a more detailed block diagram of a rich profile system of the present invention.

Referring now to FIG. 3, there is illustrated a more detailed block diagram of a rich profile system 300 of the present invention. Note that herein, a computer can mean any computing device, a PDA (Personal Data Assistant), a telephone, or other devices allowing for graphical representation; a person means a person or a group of people; and, a picture means a single picture or a collage of pictures with text, audio, video, or other annotation. The rich profile system 300 (and system 100 of FIG. 1) is a program running on a computer that displays user profiles that include rich content. In this embodiment, system 300 includes the state component 102 of FIG. 1 that identifies the state of the identity 104. The system 300 also includes a visualization component 302 that can display multiple profiles at the same time, show profile data in a peripheral awareness mode or in full detail mode, and shows notification, time passage, and other markers as appropriate.

The visualization component 302 interfaces to a profile editing component 304 that facilitates an owner of the profile to make a new status entry by means of creating and annotating a picture, posting an audio or video file, etc., and for a user of other profiles to make text, audio, or otherwise comment or annotate to any other profile as means of communicating status information of the user.

The system 300 also includes a profile management component 306 interfacing to the profile-editing component 304 that allows a person (e.g., the owner of the profile) to make his/her profile available for other people. The profile management component 306 also facilitates allowing a person to subscribe to other profiles that they want to be made aware of and to add or remove profiles to or from the list of profiles as appropriate. The user can manage a peripheral awareness mode, editing mode, and other modes, as appropriate for the user. The profile management component 306 facilitates the caching of images and other data to improve the responsiveness of the system 300, and can perform caching of usage statistical data derived from statistical analysis that may be of interest to the profile users, such as how many people are subscribing to a profile.

The system 300 also includes a communications and notification component 308 that facilitates communicating with other rich profile systems by means of web communications, web broadcasting, peer-to-peer communications, messenger-type service, email, and phone, for example. The communications and notification component 308 provides the system user the ability to post and propagate profile changes to other systems subscribing to a given profile, in real time.

The communication portion of the communications and notification component 308 may require a support module running on a computer that can communicate with computers displaying the rich status. The type of the support module depends on the implementation of the communications and notifications component layer. For example, it can be implemented as a web server to exchange files, a web service to exchange profile data, and a web broadcast feed such as RSS or other similar service to push profile data. Additionally, an e-mail or messenger-type communications server can be used if e-mail or messenger-type communications is used to propagate profiles. For some technologies, a support module may not be needed. For example, a peer-to-peer implementation can encapsulate the communications and notifications component 308 into one program with the other components (302, 304, and 306), as described above.

The system 300 also includes the graphical indicia 110 that can be accessed by one or more of the other system components (102, 302, 304, 306, and 308). The entity 104 is accessed to determine the status thereof. The system 300 outputs the personalized graphical indicia 110 to the subscriber via the visualization component 302 in accordance with the state of the entity 104. Of course, the components of the system 300 can be configured to interface to one another in any manner suitable for providing the system and features of the present invention.

Figure 4:
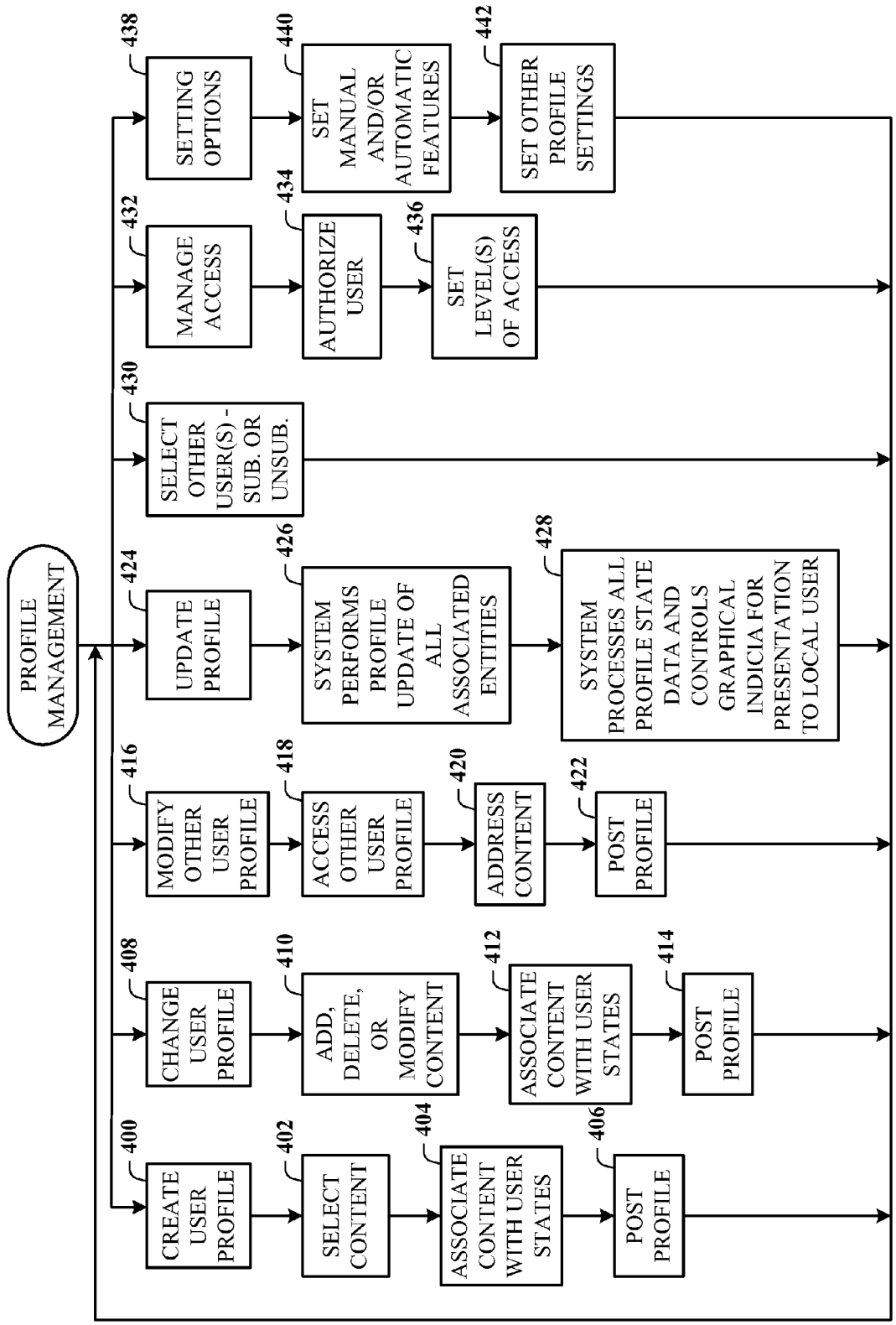
FIG. 4 illustrates a flow chart of a process for rich profile management in accordance with the present invention.

Referring now to FIG. 4, there is illustrated a flow chart of a process for rich profile management in accordance with the present invention. The management feature allows the local user to configure a number of different aspects in accordance with the present invention, including, but not limited to the following: creating a user profile, changing a user profile, modifying another user profile, updating a profile, selecting other users, managing access to a profile, and setting options. At 400, the local user can create a user profile that includes rich content as a means for providing feedback to other subscribers of the system and profile as to the status of the local user. At 402, the local user provides and selects the content desired to be employed to represent the various states of the local user. At 404, the local user then associates the content with the various predetermined states. Note that the system of the present invention can be implemented with a set of default states that are deemed common to most users. Furthermore, the system allows the user to introduce custom states that can be employed to indicate user status according to the particular user. For example, where a user may work part-time or be a contract employee working according to a non-traditional work regimen, the user status can be unique relative to full-time employees or users. At 406, once information has been provided for this management feature, the local user posts the user profile for access. Flow is then back to the top such that other user options can be made.

Another option provided by the system of the present invention allows the local user to change the local user profile, as indicated at 408. At 410, the local user can add, delete, or modify content. At 412, the user then associates the added or modified content with the desired user states. At 414, the local user then posts the changed profile such that all other subscribers are updated to the changed local user profile. Flow is then back to the top such that other user options can be made.

Still another option provided by the system of the present invention allows the local user to address changes to another user profile, as indicated at 416. At 418, the local user accesses the remote profile. This can be a public implementation where no authorization to access is required. At 420, the local user addresses the exposed content by communicating to the remote user comments related to content or changes desired. In one implementation, the local user can only input comments to content that is being offered out for comment by the remote user. The comments can be in the form of textual annotations. In another implementation, the remote user allows the local user to make significant changes to the remote user profile content, including deletion and/or replacement of the content. Once comments or changes have been made, the remote user profile is posted such that all changes are propagated to other subscribing users, as indicated at 422. Flow is then back to the top such that other user options can be selected.

At 424, the user can choose that the system perform an update of the local profile. For example, if the local profile updates according to a predetermined regular interval, yet the local user chooses not to wait for the next update time to arrive, the user can manually initiate the next update to occur. At 426, the system initiates a profile update of all associate profile entities of the local user. In response, the system communicates with the associated other profiles, and obtains status information of the entities, as indicated at 428. Depending on the state of the entities, the system will present and/or control graphical indicia of the local system to provide feedback to the local user that represents to the local user the state of the associated entity. Flow is then back to the top such that other user options can be selected.

At 430, the local user can choose to subscribe or unsubscribe to one or more other user profiles to view. This not required, however, in that it is appreciated that the user may simply be a push-down entity that simply outputs user status information, and is not a consumer of other user status information. For example, a system-wide status indicator can be employed where all system users subscribe to a push-down profile that automatically notifies all subscribers of emergency situations, for example, or corporate-wide changes in status.

As indicated previously, the system can be implemented in a public environment where all users are granted access to all other user profiles. Alternatively, at 432, the local user can manage access to his or her profile, such that the system of the present invention can be implemented with a mixed environment of public and "private" access (where a given user may be allowed to authorized access or a level of access to their profile), or even a totally private implementation where all users authorize access to any other user. At 434, the local user authorizes a remote user who may have requested authorization to the local user profile. At 436, the local user sets the levels of access for the authorized remote user. Flow is then back to the top such that other user options can be selected.

At 438, other profile options settings can be employed. For example, at 440, the local user can choose among a number of options for automatic operation or manual operation. These can include, but are not limited to allowing the system to determine the layout of the profiles on the display for a given computing device, and allowing the system to perform profile shuffling according to predetermined criteria. At 442, the user can configure other profile options such as colors, files (e.g., audio, video, and music) to associate with a profile, to select the profile for a given event, flashing indicators, audio indicators, slide show preferences, set timing features for aging and temporal features, sorting aspects, menuing options, and so on. Flow is then back to the top such that other user options can be selected.

Figure 5:
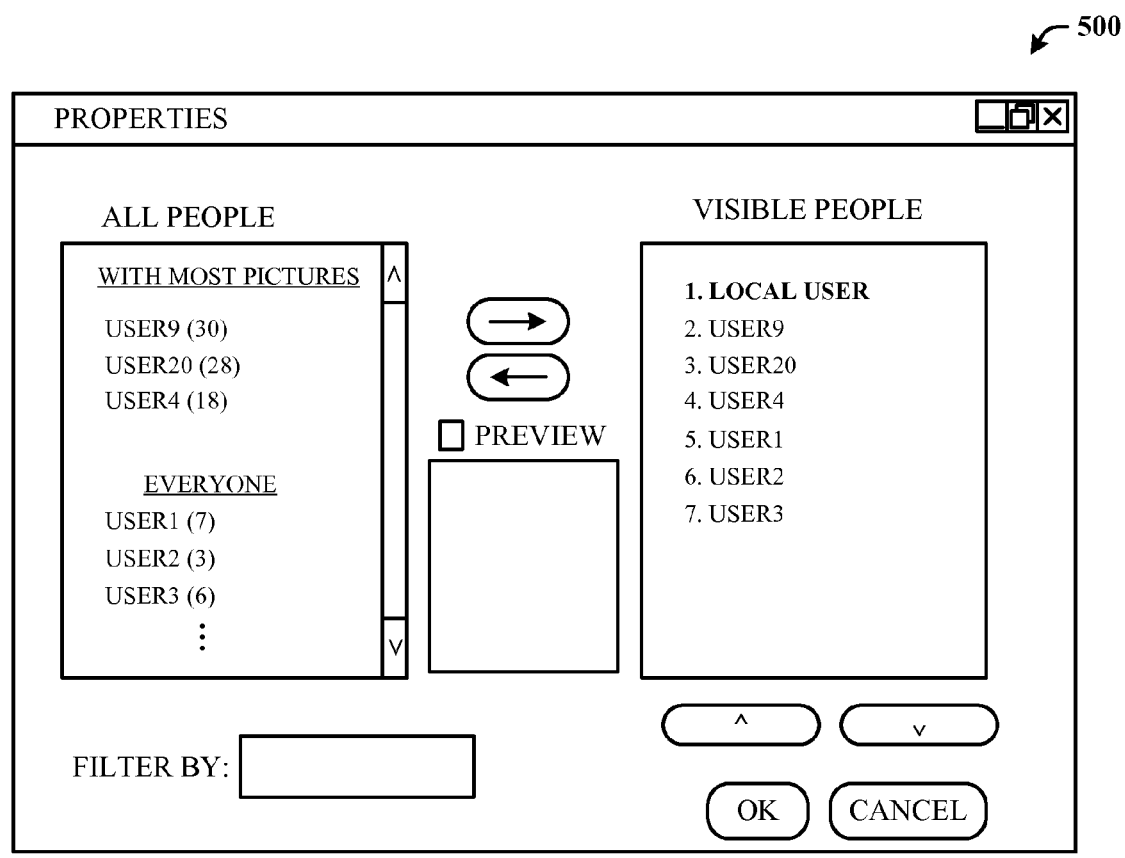
FIG. 5 illustrates a sample window for performing a number of configuration features in accordance with the present invention.

Referring now to FIG. 5, there is illustrated a sample window 500 for performing a number of configuration features in accordance with the present invention. The window 500 facilitates the presentation of all users according to one or more categories. In an ALL PEOPLE window, all users can be listed alphabetically under a heading EVERYONE in ascending or descending order. Additionally, the local user can select that users with the most tiles or pictures be listed alphabetically under a WITH MOST PICTURES heading. From either or both of these headings, the local user can select and move a user from the ALL PEOPLE category to a VISIBLE PEOPLE category of the window 500 by highlighting the user name, and then selecting a "move" button (indicated as a right-arrow button) to indicate that these are users of which the local user wants the status. Here, the local user has selected six other users that her or she is interested in keeping the status (denoted herein as USER9, USER20, USER4, USER1, USER2, and USER3). By default, the system automatically includes the local user in the listing.

Not only can the local user select which users to status, but the local user can also adjust the priority in which to status the users. This is facilitated by two up-down radio buttons. Here, the local user has adjusted the VISIBLE PEOPLE rankings such that the system statuses the six other users in the following descending order: USER9, USER20, USER4, USER1, USER2, and USER3. The window 500 also allows the local user to remove a user from the VISIBLE PEOPLE list by highlighting the user name, and then selecting a "remove" button (indicated as a left-arrow button).

Figure 6:
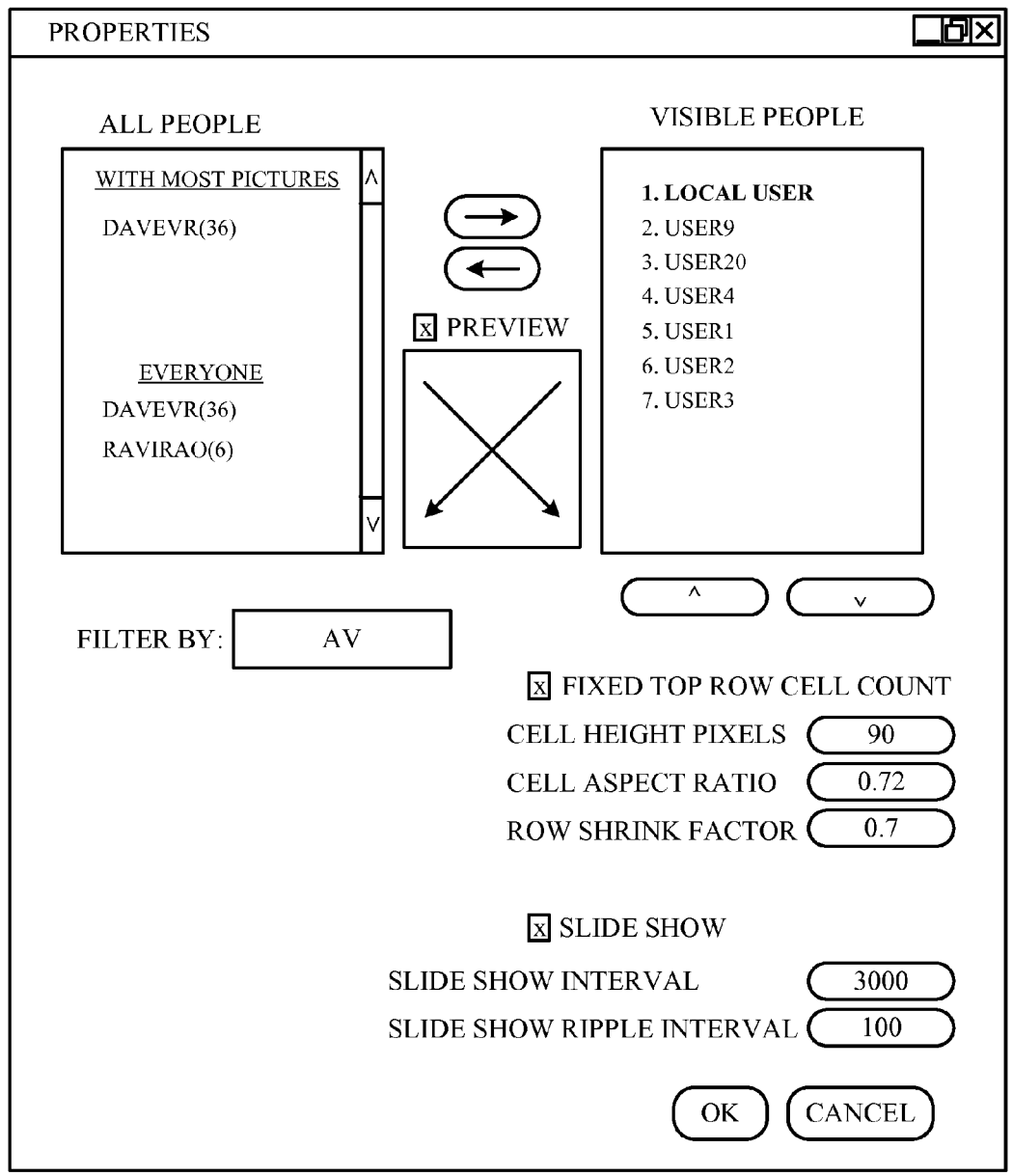
FIG. 6 illustrates an expanded view of a sample window where filtering and tile presentation can be controlled by the local user.

Referring now to FIG. 6, there is illustrated an expanded view of a sample window 600 where filtering and tile presentation can be controlled by the local user. Here, the local user has chosen to search for all users in both the WITH MOST PICTURES and EVERYONE categories whose names include the string "av". A user with the name "davevr" was a result under both categories. Either or both of the search results can then be moved across to the VISIBLE PEOPLE category to provide status information for those users.

In the lower portion of the window 600, the local user can adjust picture parameters that affect how the pictures of the visible users will be presented. As will be described in greater detail hereinbelow, pictures or other multimedia (or graphical indicia) content can be displayed on the chosen computing device(s) of the local user. The local user can prioritize the content according to rows, with, for example, a top row including the high priority entities that the local user chooses to status, a second row having lower priority entities to status, and so on. Accordingly, the window 600 provides user adjustment to the size and dimensions of the first row images. Here, the top row images are 90 pixels in height with an aspect ratio of 0.72. The shrink factor parameter (i.e., 0.7) defines the reduced size of subsequent underlying rows of images. Thus, the second row will have the same aspect ratio, but at only 70% the size of the first or top row. The third row will be reduced to 70% of the second row, and so on. The window 600 also allows the local user to present the content as a slide show by setting the slide show interval (e.g., 3000 milliseconds) and a ripple interval of 100. The window 600 also allows the local user to select a Preview button to preview the last picture of the selected user.

It is to be appreciated that other methods of indicating profile priorities can be employed. For example, settings can be provided for the number of profiles for a row, and automatic adjustment or resizing of profile indicia based on historical and statistical data.

Figure 7:
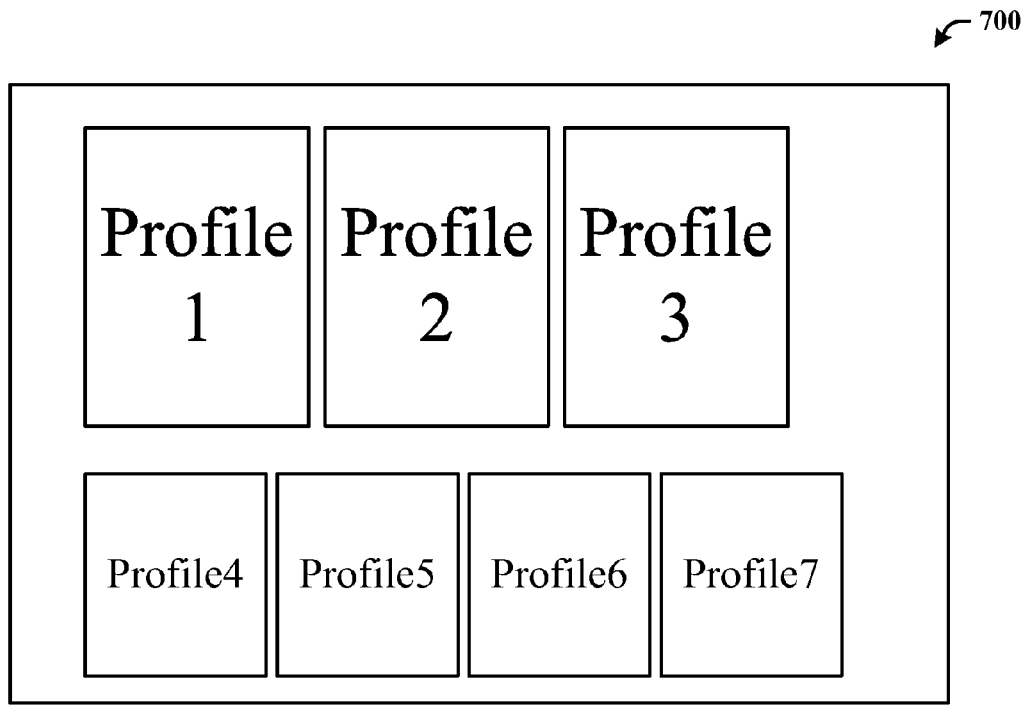
FIG. 7 illustrates a panel of thumbnail profiles presented to the local user according to the remote users chosen to view.

Referring now to FIG. 7, there is illustrated a panel 700 of thumbnail profiles presented to the local user according to the remote users chosen to view. Here, the local user has selected seven remote entities of which to maintain status information. Users associated with Profile1, Profile2, and Profile3 have been selected as a higher priority then users associated with Profile4, Profile5, Profile6, and Profile7, that are on a second row and smaller in size. Note that priority can also be stipulated on a row in a left-to-right fashion, for example. Of course, the order can be reversed at the discretion of the local user such that the highest priority user is on the right of the first or top row.

When the system performs an update, these profiles can change to reflect the current state of the associated user. Note that an image or other profile indicia can be linked to one or more files, such that when a new profile is presented to reflect a change in the user state, an audio (e.g., voice and/or music) file will be played by the local user machine. To facilitate such a feature, the remote user can record the voice file, for example, using a microphone, and associate the voice file with the desired image. Another way includes the remote user dragging and dropping a music file onto a profile picture. The remote user computer remembers the fact that a music annotation has been created and clones the music file to the profile status. The communication module on the local user computer then communicates the new profile status information that is the file along with the annotation information, connecting it to the correct profile being viewed to the local user machine. When the local computer updates the profiles, the new content can be annotated with a music symbol or graphic, for example, and if selected, the music plays. Of course, this can be configured to play automatically, too. Note that it is a matter of preference whether the music plays automatically when the content changes in any way or according to manual selection the local user selects on a music indicium.

The system processes and analyzes data related to a number of events and/or criteria. For example, the system can analyze the frequency of communication between the various visible users of the local user to develop a communication history. Based on the history data, the type and ranking of profiles can be automatically adjusted, if desired. For example, if the top row-left image is meant to be the high priority remote user which the local user wishes to status, yet the remote user associated with the second row-second profile is responsible for most of the communication traffic, that top-row profile or one of the other top-row profiles can be shuffled to the second row, while the second row-second profile is shuffled to the top row. Of course, the profile size will adjust according to the row in which it is placed. This shuffling can occur according to a number of different criteria, e.g., communication history, the type of remote user, the group that the remote person is associated with, time of day (or week), and proximity in time to an upcoming event, to name a few.

Additionally, the content and profile data can be controlled for many purposes. The information the local user displays in the profile may not be the same as the information used to sort, select, or otherwise decide which profiles and what parts of those profiles to display. For instance, the local user can choose to display a thumbnail (published by the remote user), a nickname (created by the local user), and current status (as determined by computer) of the five people the local user communicates with the most.

Figure 8:
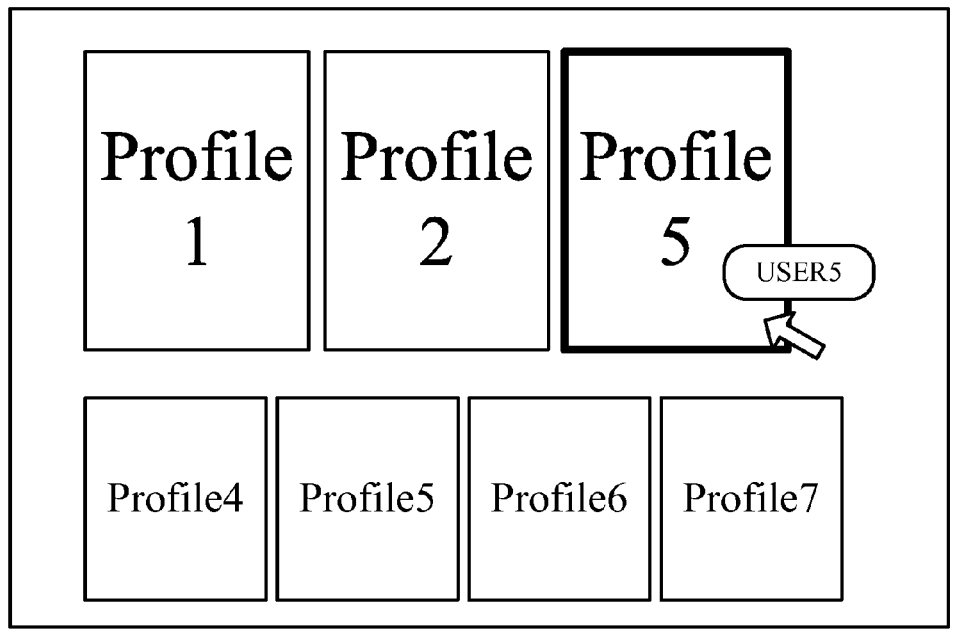
FIG. 8 illustrates the panel of the thumbnail profiles of FIG. 7 and features presented when the local user selects a profile.

Referring now to FIG. 8, there is illustrated the panel 800 of the thumbnail profiles of FIG. 7 and features presented when the local user selects a profile. Here, the local user chooses to determine what entity is associated with Profile5 by selecting the profile. The system provides some indication to the user that the profile is selected, e.g., by presenting different colored bar around the profile borders, flashing a different color border, etc. In response, the system automatically presents a pop-up balloon showing the name (e.g., USER5) of the associated entity.

Figure 9:
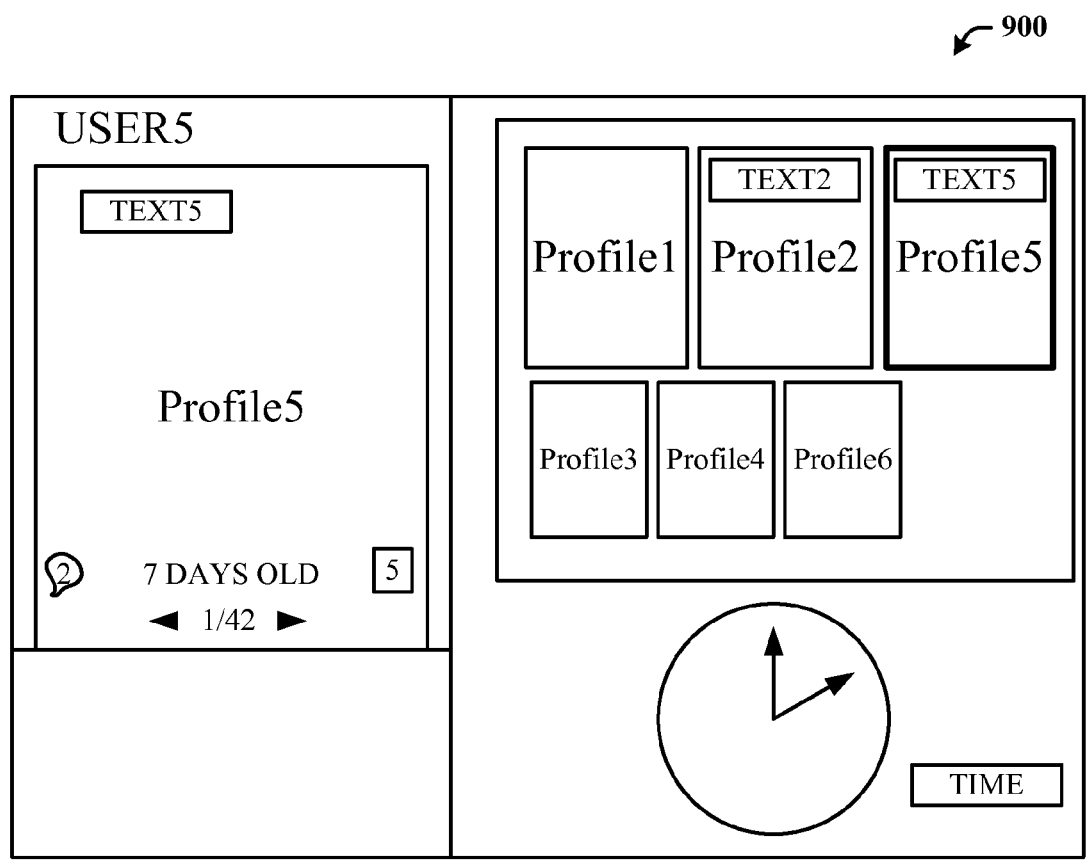
FIG. 9 illustrates a window that shows sample detailed information that can be obtained about a particular profile of an entity.

Referring now to FIG. 9, there is illustrated a window 900 that shows sample detailed information that can be obtained about a particular profile of an entity. Here, the local user selected Profile5 of which to view further details. The user can switch from viewing thumbnail profiles to larger detailed profiles by selecting the profile (e.g., clicking with a mouse pointer), hovering the pointer over the thumbnail profile, or some other method. Note that indicia can be presented on both the thumbnail and larger profiles. Moreover, different indicia can be chosen for presentation on the profiles, and also different indicia styles for the same indicia. The associated username is presented, text annotation, and other data. For example, the system presents to the local user temporal data in the form of text ("7 days old") that indicates how long the profile has been in use. The system can provide more recognizable indicia representative of the aging of the profile by using varying border colors over time, providing flashing indicia, and/or sounds associated with the profile. The text is provided in a more social dimension that is readily understandable to the viewer. That is, the dimensions are in hours, days, weeks, and months, in contrast to a large number of hours that is not so intuitive (e.g., 4500 minutes, 125 hours).

The profile also has associated therewith a counter "5" that indicates the number of other users who have viewed this profile. A comment balloon indicates how many other users ("2") have provided comments back on the given profile. There is also provided a flipper control that allows the local user to flip through all of the other profiles ("42") associated with that user (USER5).

Figure 10:
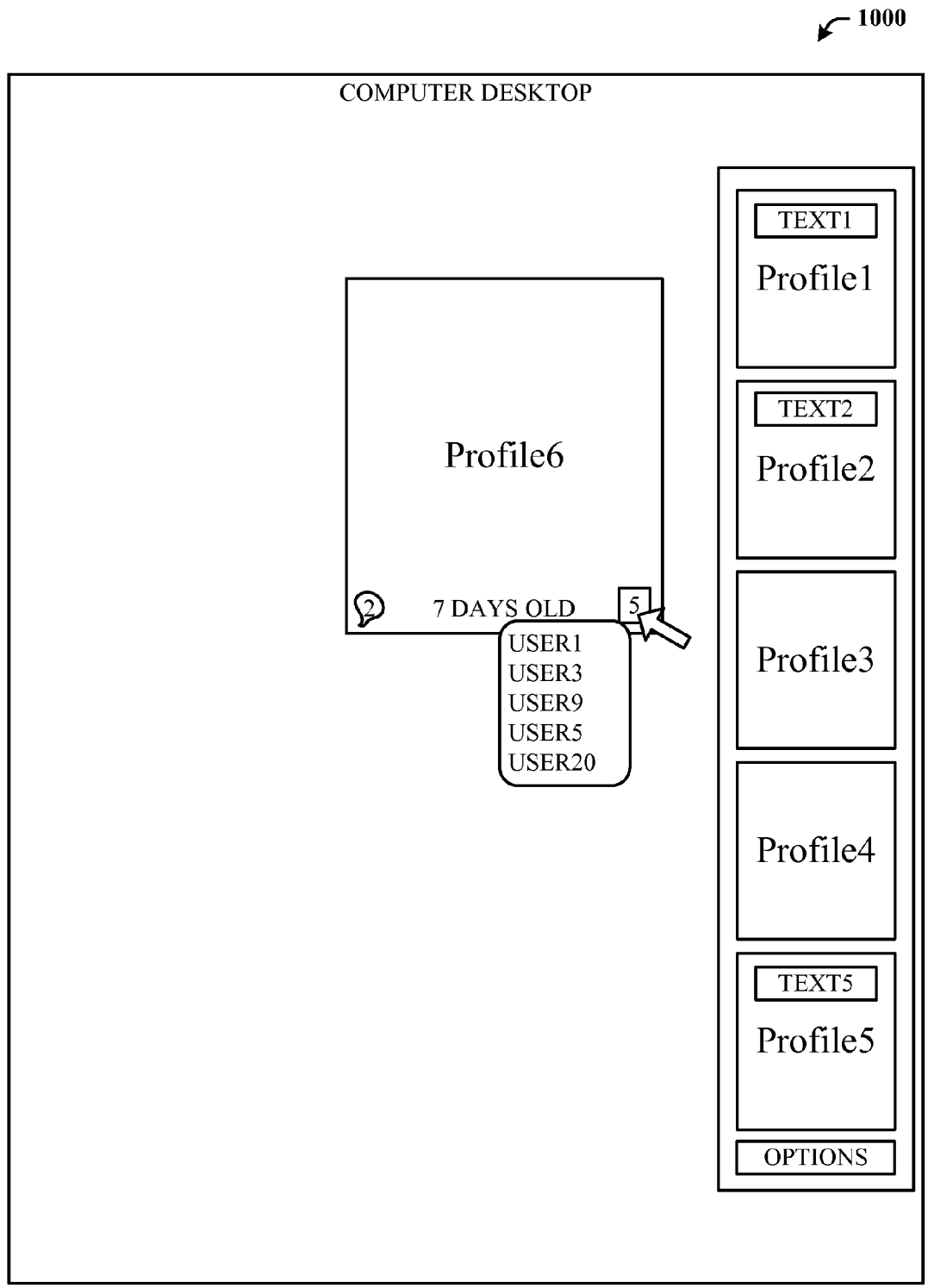
FIG. 10 illustrates a desktop layout on a computer of thumbnail profiles of the other users selected by the local user for statusing.

Referring now to FIG. 10, there is illustrated a desktop layout 1000 on a computer of thumbnail profiles of the other users selected by the local user for statusing. Here, a vertical arrangement of thumbnail profiles is employed as a side panel along a side of the desktop such that the status information is easily viewable, yet out of the way of other user functions being performed on the computer. The user can switch from viewing thumbnail profiles to larger detailed profiles by selecting the profile (e.g., clicking with a mouse pointer), hovering the pointer over the thumbnail profile, or some other method. Alternatively, the user can maintain one or more of the profiles in an enlarged format for easier statusing of the corresponding image. Here, Profile6 is being reviewed by hovering the pointer over an indicia ("5") that indicates the number and names of other users who have viewed the Profile6. The names are presented in a pop-up window. The order of the names can be adjusted according to any type of criteria, for example, in what order the users viewed the picture from first to last, alphabetically, and so on. As before, the comment balloon indicates the number users ("2") who have commented on the Profile6.

Figure 11:
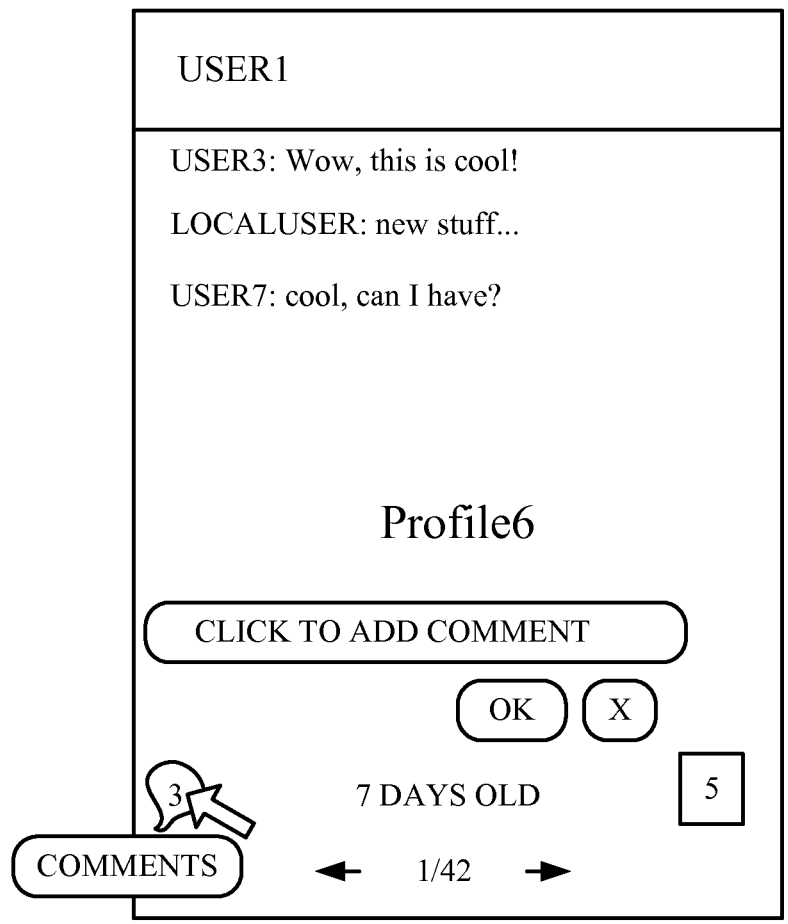
FIG. 11 illustrates an example comment window for a profile.

Referring now to FIG. 11, there is illustrated an example comment window 1100 for a profile. When the local user offers a profile image or other content out for comment, another user can provide a comment by selecting a comment button. Here, three comments have been provided: one by a USER3, one by a USER7, and one by the LOCALUSER. The window 1100 also shows the aging information and the flipper controls for flipping through other profile images of the user USER1. It is to be appreciated by one skilled in the art that similar to annotating a profile with comments, a user can annotate a profile with audio and/or video clips. By way of example, but not restriction, such annotation can be performed by dragging and dropping the file, clip graphic or icon to the profile. The system will automatically present the appropriate indicia to indicate the presence of the audio and/or video clip association.

Figure 12:
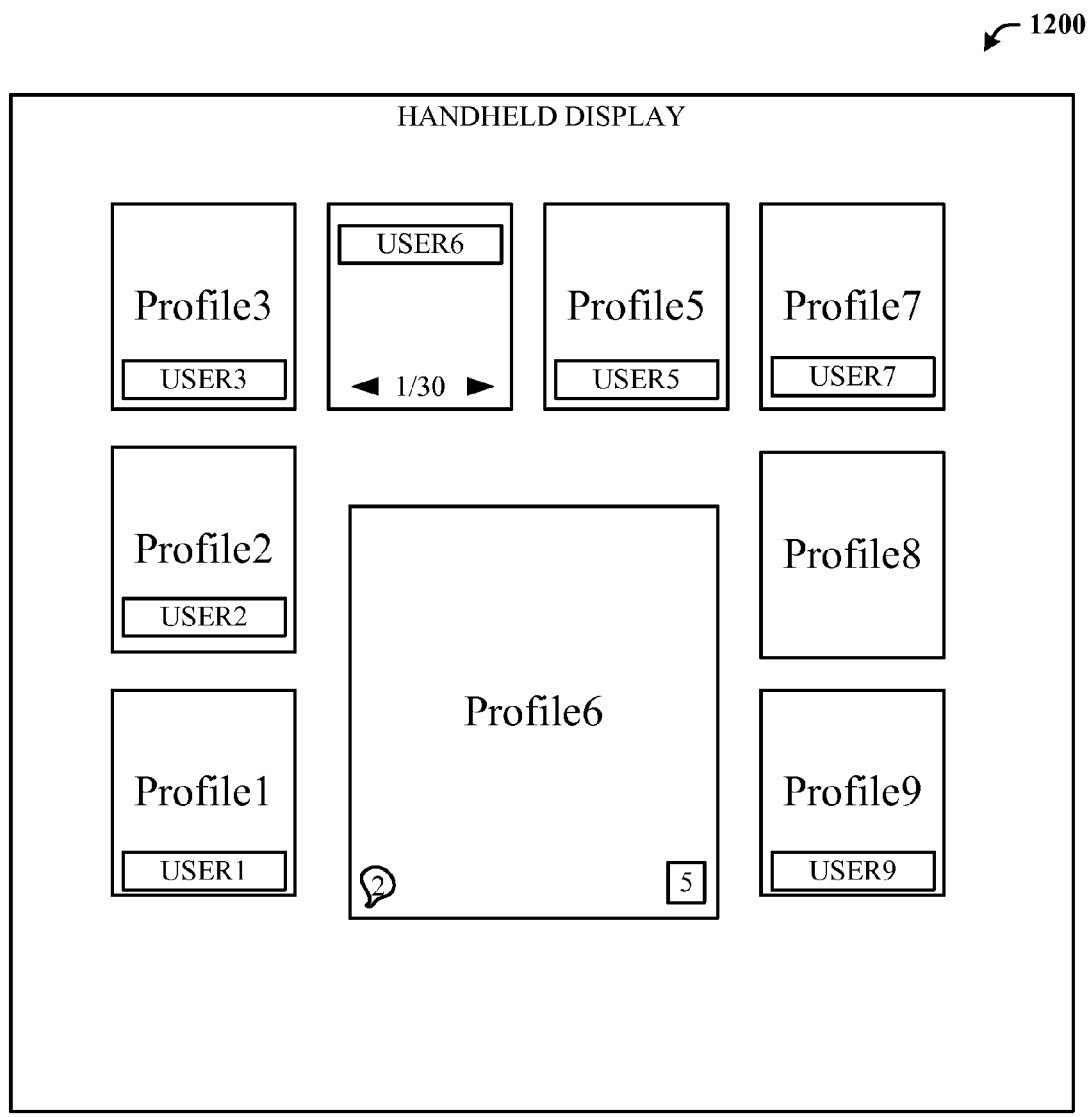
FIG. 12 illustrates an example presentation of other user entity thumbnail profiles when using a handheld computing device.

Referring now to FIG. 12, there is illustrated an example presentation 1200 of other user entity thumbnail profiles when using a handheld computing device. Due to the reduced viewing capabilities of such devices, one or more of the important profiles can be displayed larger than the less important profiles, which are shown around the periphery of the display area. In this implementation, the larger profile that is centered on the display can be placed there either according to a manual operation or automatically according to predetermined criteria. For example, the local user can fix the locations of the large centered profile and the surrounding smaller profiles, such that the locations of a given profile are changed only by manual configuration.

Alternatively, given that the portable device display can be small and more difficult to view the smaller peripheral profiles, the system can employ an automatic feature that moves the most recently changed profile to the center in an enlarged mode such that the local user can more easily and readily identify the remote user associated with the profile and the profile content. If a next remote profile is updated, the center profile will then be moved to the side in a reduced size mode, and the most recently updated profile will be moved to the center. This provides an obvious indication to the local user of a changed profile, as the user can see the movement of profiles on the display. Automatic shuffling and placement can be performed according to any number of different criteria, including but not limited to, the type of profile, type of profile content, the user associated with the profile, and the number of remote users visible to the local user. Such manual and automatic features are not limited to portable computing devices, but can also be utilized on a desktop computing device or larger systems.

Figure 13:
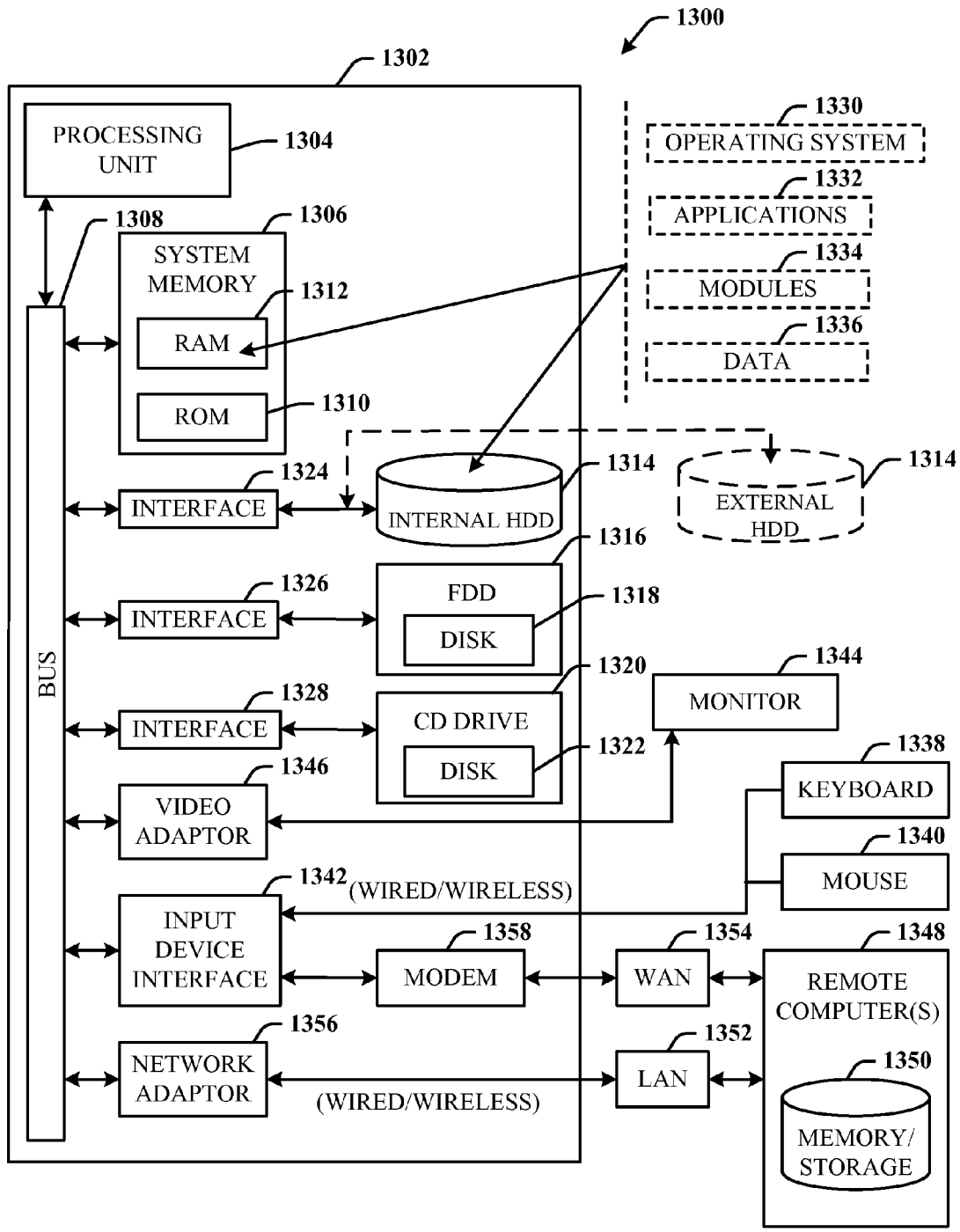
FIG. 13 illustrates a block diagram of a computer operable to execute the disclosed architecture.

Referring now to FIG. 13, there is illustrated a block diagram of a computer operable to execute the disclosed architecture. In order to provide additional context for various aspects of the present invention, FIG. 13 and the following discussion are intended to provide a brief, general description of a suitable computing environment 1300 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, there is illustrated an exemplary environment 1300 for implementing various aspects of the invention that includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 may be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1313, a magnetic disk drive interface 1326 and an optical drive interface 1328, respectively. The interface 1313 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312.

It is appreciated that the present invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but may be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers etc.

The computer 1302 may operate in a networked environment using logical connections via wired and/or wireless communications to one or more remote computers, such as a remote computer(s) 1348. The remote computer(s) 1348 may be a workstation, a server computer, a router, a personal computer, portable computer, microprocessor-based entertainment appliance, a peer device or other common network node, and typically includes many or all of the elements described relative to the computer 1302, although, for purposes of brevity, only a memory storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356. When used in a WAN networking environment, the computer 1302 can include a modem 1358, or is connected to a communications server on the LAN, or has other means for establishing communications over the WAN 1354, such as by way of the Internet. The modem 1358, which may be internal or external and a wired or wireless device, is connected to the system bus 1308 via the serial port interface 1342. In a networked environment, program modules depicted relative to the computer 1302, or portions thereof, may be stored in the remote memory/storage device 1350. It will be appreciated that the network connections shown are exemplary and other means of establishing a communications link between the computers may be used.

The computer 1302 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 14:
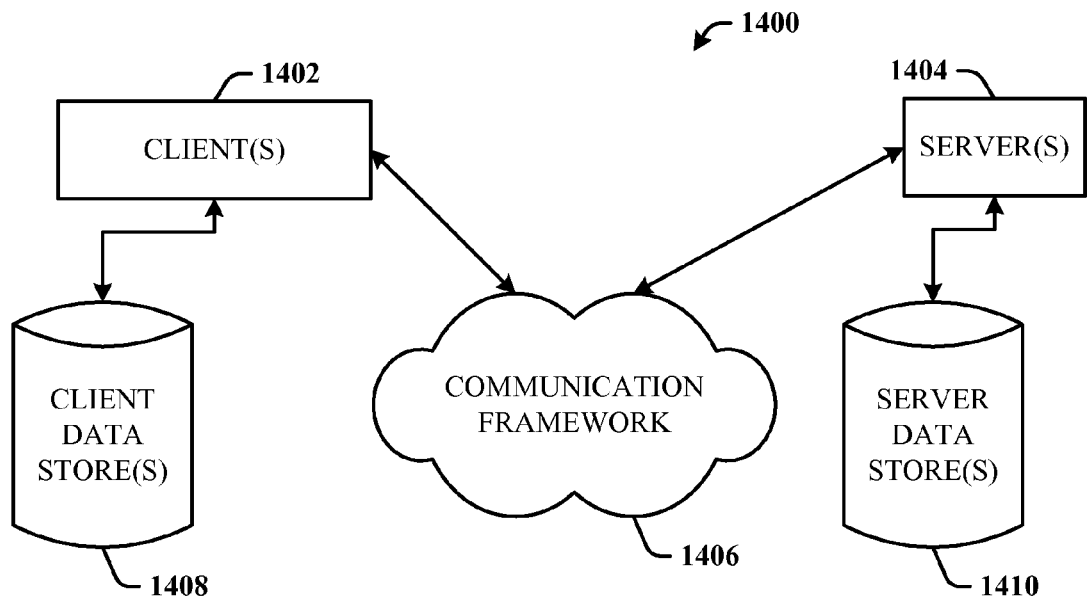
FIG. 14 illustrates a schematic block diagram of an exemplary client/server computing environment in accordance with the present invention.

Referring now to FIG. 14, there is illustrated a schematic block diagram of an exemplary client/server computing environment 1400 in accordance with the present invention. The system 1400 includes one or more client(s) 1402. The client(s) 1402 can be hardware and/or software (e.g., threads, processes, computing devices). The client(s) 1402 can house cookie(s) and/or associated contextual information by employing the present invention, for example. The system 1400 also includes one or more server(s) 1404. The server(s) 1404 can also be hardware and/or software (e.g., threads, processes, computing devices). The servers 1404 can house threads to perform transformations by employing the present invention, for example. One possible communication between a client 1402 and a server 1404 may be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications may be facilitated via a wired (including optical fiber) and/or wireless technology. The client(s) 1402 are operably connected to one or more client data store(s) 1408 that can be employed to store information local to the client(s) 1402 (e.g., cookie(s) and/or associated contextual information). Similarly, the server(s) 1404 are operably connected to one or more server data store(s) 1410 that can be employed to store information local to the servers 1404.

The server(s) 1404 may be utilized to host the messaging system for use by the clients(s) 1402. User profile information may be stored on the server data stores 1410, and accessed when needed to determine levels of permission for various user entities.

Figure 15:
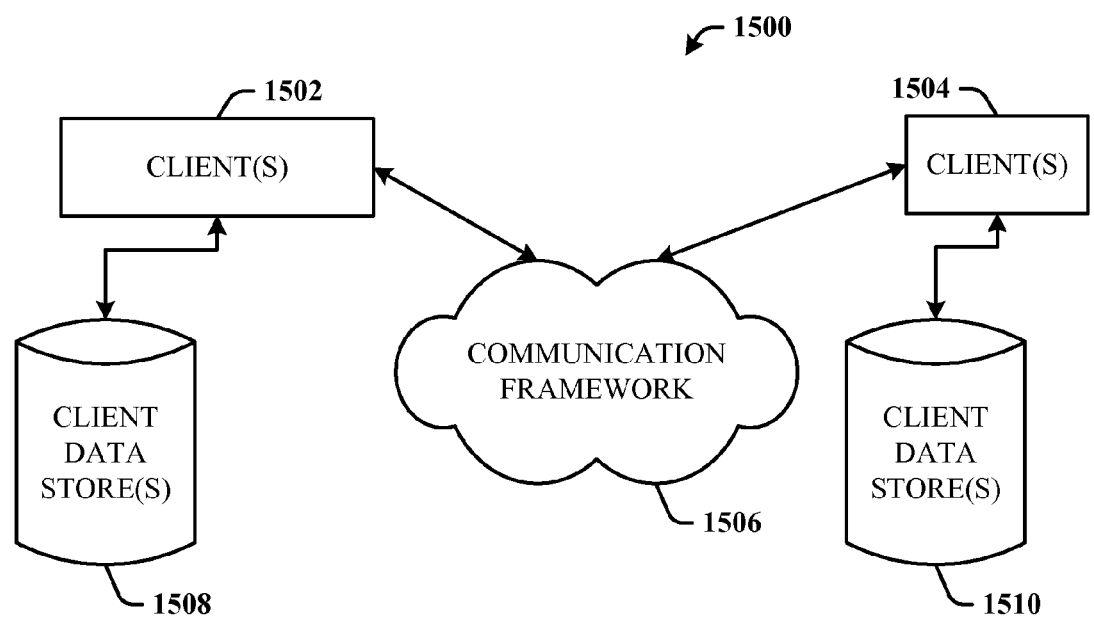
FIG. 15 illustrates a schematic block diagram of an exemplary peer-to-peer computing environment in accordance with the present invention.

Referring now to FIG. 15, there is illustrated a schematic block diagram of an exemplary peer-to-peer computing environment 1500 in accordance with the present invention. The system 1500 includes a first client 1502 in communication with a second client 1504 via a communication framework 1506. The clients (1502 and 1504) can be hardware and/or software (e.g., threads, processes, computing devices). The clients (1502 and 1504) can house cookie(s) and/or associated contextual information by employing the present invention, for example. One possible communication between the client (1502 and 1504) may be in the form of a data packet adapted to be transmitted between two or more computer processes. The data packet may include a cookie and/or associated contextual information, for example. The system 1500 includes the communication framework 1506 (e.g., a global communication network such as the Internet) that can be employed to facilitate communications between the clients (1502 and 1504). Communications may be facilitated via a wired (including optical fiber) and/or wireless technology. The clients (1502 and 1504) are operably connected to one or more respective client data stores (1508 and 1510) that can be employed to store information local to the clients (1502 and 1504) (e.g., cookie(s) and/or associated contextual information).

In accordance with the present invention, either client can choose to receive status information of the other.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors configured to execute computer-executable instructions; and
   one or more memories storing the computer-executable instructions, the one or more memories comprising:
   a visualization component configured to present a thumbnail view of at least one profile associated with an entity, the entity being an individual or group of individuals;
   a profile management component configured to facilitate management of the at least one profile by allowing a user to select one or more files for association with individual states of a plurality of states of the entity;

a state component configured to receive information relating to a state of the entity;

an inference component configured to infer the state of the entity at a predetermined time based at least in part on past data indicating that the state occurs at the predetermined time; and a notifications component configured to dynamically render at least one personalized graphical indicium representative of the state of the entity, the at least one personalized graphical indicium being based at least in part on a user selected file of the one or more files that is associated with the state.

2. The system of claim 1, wherein the visualization component is further configured to present the thumbnail view of the at least one profile on a periphery of a display.

3. The system of claim 1, wherein the visualization component is further configured to present the at least one profile in detail mode by presenting data representative of notification, time passage, or state indicators.

4. The system of claim 1, further comprising a profile editing component configured to facilitate entry of new status data by an owner of the at least one profile by at least one of creating and annotating a picture, or posting an audio and/or video file.

5. The system of claim 1, wherein the profile management component is further configured to facilitate allowing an owner of the at least one profile to provide access to the at least one profile by at least one other user.

6. The system of claim 1, wherein the profile management component is further configured to facilitate allowing the user to at least one of subscribe to another profile, add a profile, or remove a profile.

7. The system of claim 1, wherein the profile management component is further configured to facilitate caching of images and usage statistical data.

8. The system of claim 1, further comprising a communications component configured to facilitate posting and propagation of profile changes in real-time to another system that subscribes to the at least one profile.

9. The system of claim 1, wherein the at least one personalized graphical indicium is configured to be rendered as a function of one of a type of recipient or a type of device on which the at least one personalized graphical indicium is to be rendered.

10. The system of claim 1, wherein the at least one personalized graphical indicium comprises multimedia content that includes at least one of animation or a slide show of images.

11. The system of claim 1, wherein the plurality of states include predetermined states and at least one custom state provided by the user.

12. A computer-implemented method comprising:
generating at least one profile associated with an entity, the entity being an individual or group of individuals;

receiving, via user input, a selection of a file for association with a state of a plurality of states of the entity;

causing presentation of the at least one profile in a thumbnail view;

receiving, by one or more processors, state information associated with the state of the entity;

inferring the state of the entity at a predetermined time based at least in part on past data indicating that the state occurs at the predetermined time; and updating the thumbnail view of the at least one profile in real-time based upon the state of the entity by dynamically rendering at least one graphical indicium representative of the state of the entity, the at least one graphical indicium being based at least in part on the file associated with the state.

13. The computer-implemented method of claim 12, further comprising requesting comments related to the at least one profile from a subscriber to the at least one profile.

14. The computer-implemented method of claim 12, wherein the file comprises an audio and/or video file, the method further comprising playing the audio and/or video file.

15. The computer-implemented method of claim 14, further comprising receiving a user selection of the at least one graphical indicium, wherein playing the audio and/or video file occurs at least partly in response to receiving the user selection.

16. A computer-implemented method comprising: receiving, via user input, a profile management instruction to associate a file with a state of a plurality of states of an entity, the entity being an individual or group of individuals;

receiving, by one or more processors, state information associated with the state of the entity;

inferring the state of the entity at a predetermined time based at least in part on past data indicating that the state occurs at the predetermined time;

causing presentation of a thumbnail view of a profile displaying at least one graphical indicium representative of the state of the entity, the at least one graphical indicium being based at least in part on the file associated with the state; and updating the thumbnail view of the profile in real-time based upon a change in state of the entity by dynamically rendering a different graphical indicium based at least in part on a different file associated with the change in the state.

17. The computer-implemented method of claim 16, wherein the file comprises an audio and/or video file, the method further comprising playing the audio and/or video file.

18. The computer-implemented method of claim 17, further comprising receiving a user selection of the at least one graphical indicium, wherein playing the audio and/or video file occurs at least partly in response to receiving the user selection.

* * * * *